United States Patent
Cappaert et al.

(10) Patent No.: US 9,830,297 B2
(45) Date of Patent: Nov. 28, 2017

(54) PROCESSOR SYSTEM FOR CONTROL OF MODULAR AUTONOMOUS SYSTEM

(71) Applicant: Spire Global, Inc., San Francisco, CA (US)

(72) Inventors: Jeroen Cappaert, Sint-Gillis-Waas (BE); Jesse Trutna, Eureka, CA (US); Nicholas Shrake, Emeryville, CA (US)

(73) Assignee: SPIRE GLOBAL, INC., San Francisco, CA (US)

( * ) Notice: Subject to any disclaimer, the term of this patent is extended or adjusted under 35 U.S.C. 154(b) by 270 days.

(21) Appl. No.: 14/632,535

(22) Filed: Feb. 26, 2015

(65) Prior Publication Data

US 2016/0253284 A1 Sep. 1, 2016

(51) Int. Cl.
*G06F 13/42* (2006.01)
*G06F 13/40* (2006.01)
*H04B 7/185* (2006.01)

(52) U.S. Cl.
CPC ...... *G06F 13/4282* (2013.01); *G06F 13/4022* (2013.01); *G06F 13/4226* (2013.01); *G06F 13/4295* (2013.01); *H04B 7/18515* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 4,454,510 A | 6/1984 | Crow | |
| 5,940,739 A | 8/1999 | Conrad et al. | |
| 6,023,291 A | 2/2000 | Kamel et al. | |
| 6,356,966 B1 | 3/2002 | Loach et al. | |
| 7,503,511 B2 | 3/2009 | Mueller | |
| 7,733,635 B2 | 6/2010 | Sullivan | |
| 7,860,582 B2 | 12/2010 | Ghercioiu et al. | |
| 8,117,587 B1 * | 2/2012 | Testardi | G06F 8/447 717/100 |
| 8,306,385 B2 | 11/2012 | Hino et al. | |
| 8,378,913 B2 | 2/2013 | Tao et al. | |

(Continued)

FOREIGN PATENT DOCUMENTS

WO 2014121197 A2 8/2014

OTHER PUBLICATIONS

International Search Report and Written Opinion dated Nov. 18, 2016 issued in corresponding PCT International Application No. PCT/US2016/014863.

(Continued)

*Primary Examiner* — Henry Tsai
*Assistant Examiner* — Christopher Bartels
(74) *Attorney, Agent, or Firm* — Troutman Sanders LLP (57) ABSTRACT

A cubesat communications system includes an on-board computer implemented on a hardware platform. The on-board computer may include a system on module having a processor and a memory storing "boot" information. The on-board computer may also include a plurality of hardware interfaces implemented on the hardware platform to facilitate communication between the processor and a plurality of peripherals external to the on-board computer. The on-board computer may have a backplane having a plurality of connectors connecting the processor to the peripherals.

16 Claims, 4 Drawing Sheets

(56) References Cited

U.S. PATENT DOCUMENTS

| | | |
|---|---|---|
| 8,482,610 B2 | 7/2013 | do Carmo Miranda |
| 8,487,996 B2 | 7/2013 | Mann et al. |
| 8,531,524 B2 | 9/2013 | do Carmo Miranda |
| 8,948,080 B2 | 2/2015 | Wahlberg et al. |
| 2004/0008034 A1 | 1/2004 | Mastoris et al. |
| 2004/0226046 A1 | 11/2004 | Weng et al. |
| 2006/0282724 A1 | 12/2006 | Roulo |
| 2008/0086509 A1 | 4/2008 | Wallace |
| 2008/0291855 A1* | 11/2008 | Bata ............ H04W 84/18 370/311 |
| 2009/0087029 A1 | 4/2009 | Coleman et al. |
| 2009/0201379 A1 | 8/2009 | Schultz et al. |
| 2009/0290534 A1 | 11/2009 | Connors et al. |
| 2009/0307592 A1* | 12/2009 | Kalanithi ............ G06F 3/002 715/716 |
| 2011/0116441 A1 | 5/2011 | Wyler |
| 2011/0170797 A1 | 7/2011 | Johnson |
| 2013/0051661 A1 | 2/2013 | Robinson et al. |
| 2013/0235234 A1 | 9/2013 | Cucci et al. |
| 2013/0271628 A1 | 10/2013 | Ku et al. |
| 2013/0298083 A1 | 11/2013 | Bertoldo et al. |
| 2014/0015970 A1 | 1/2014 | do Carmo Miranda |
| 2014/0027576 A1 | 1/2014 | Boshuizen et al. |
| 2014/0039729 A1* | 2/2014 | Puig-Suari ............ B64G 1/66 701/3 |
| 2014/0039963 A1 | 2/2014 | Augenstein et al. |
| 2014/0040282 A1 | 2/2014 | Mann et al. |
| 2014/0059166 A1 | 2/2014 | Mann et al. |
| 2014/0118256 A1 | 5/2014 | Sonoda et al. |
| 2014/0222472 A1 | 8/2014 | Platzer |
| 2015/0097084 A1* | 4/2015 | Szabo ............ B64G 1/1078 244/171.1 |
| 2015/0146019 A1 | 5/2015 | Aoyama |
| 2015/0199556 A1 | 7/2015 | Qian et al. |

OTHER PUBLICATIONS

International Search Report and Written Opinion dated Apr. 27, 2016 issued in corresponding PCT International Application No. PCT/US2015/054906.

International Search Report dated Feb. 24, 2016, issued in corresponding Application No. PCT/US2015/054889.

\* cited by examiner

PROCESSOR SYSTEM FOR CONTROL OF MODULAR AUTONOMOUS SYSTEM

CROSS REFERENCE TO RELATED PATENT APPLICATIONS

This disclosure incorporates by reference the following pending U.S. patent applications: (1) Ser. No. 14/515,142, title: Satellite Operating System, Architecture, Testing and Radio Communication System filed on Oct. 15, 2014; (2) Ser. No. 14/514,836, title: Back-Plane Connector for Cubesat filed on Oct. 15, 2014; and (3) Ser. No. 14/514,573, title: Novel Satellite Communication System filed on Oct. 15, 2014. The contents of these three applications are incorporated by reference herein as if each was restated in full.

FIELD OF THE INVENTION

The inventions herein are directed to novel on-board computers implemented with hardware interfaces and connectors for communicating with peripherals. In particular, the present invention is directed to on-board computers implemented on satellite systems, such as small factor satellites (known in the art as "cubesats").

BACKGROUND

A growing interest in low earth orbit satellites having a small form factor has led to an increase in both launches of the vehicles and the recognition that earlier techniques for control thereof are inadequate. Due to their smaller size, cubesats generally cost less to build and deploy into orbit above the Earth. As a result, cubesats present opportunities for educational institutions, governments, and commercial entities to launch and deploy cubesats for a variety of purposes with fewer costs compared to traditional, large satellites.

To maximize the cubesat's usage and optimize its performance, it is desirable to configure the cubesat to accommodate a wide spectrum of peripherals of different types. As such, there is a need for a computer architecture that offers a rich interface to the cubesat so as to enhance the cubesat communications with various peripherals. Select embodiments of the disclosed technology address these needs.

SUMMARY

The disclosed technology relates to an on-board computer implemented in a small form factor satellite. The on-board computer may include a processor and a memory storing system initiation or "boot" information. The on-board computer may also include a backplane having a plurality of connectors. The connectors may physically connect the processor to a plurality of peripherals external to the on-board computer. Further, the on-board computer may include a plurality of hardware interfaces. The hardware interfaces may facilitate communication between the processor and a plurality of peripherals external to the on-board computer, but within the small form factor satellite. The hardware interfaces may include a multimedia card interface, a general-purpose input output, an Ethernet interface, a controller area network interface, an inter-integrated circuit, a serial peripheral interface, a universal asynchronous receiver/transmitter, and a video interface.

Another aspect of the disclosed technology relates to a cubesat communications system. The system may include an on-board computer implemented on a hardware platform. The on-board computer may include a processor and a memory storing selected "boot" information. The on-board computer may include a hardware interface implemented on the selected hardware platform. The hardware interface may facilitate communication between the processor and one or more peripherals external to the on-board computer. The on-board computer may include a backplane having a connector, connecting the processor to the peripheral.

Various aspects of the described illustrative embodiments may be combined with aspects of certain other embodiments to realize yet further combinations. It is to be understood that one or more features of any one illustration may be combined with one or more features of the other arrangements disclosed.

BRIEF DESCRIPTION OF THE DRAWINGS

The following Detailed Description of the technology is better understood when read in conjunction with the appended drawings. For the purposes of illustration, there is shown in the drawings exemplary embodiments, but the subject matter is not limited to the specific elements and instrumentalities disclosed. Components in the figures are shown for illustration purposes only, and may not be drawn to scale.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

1. Satellite Overview

Figure 1:
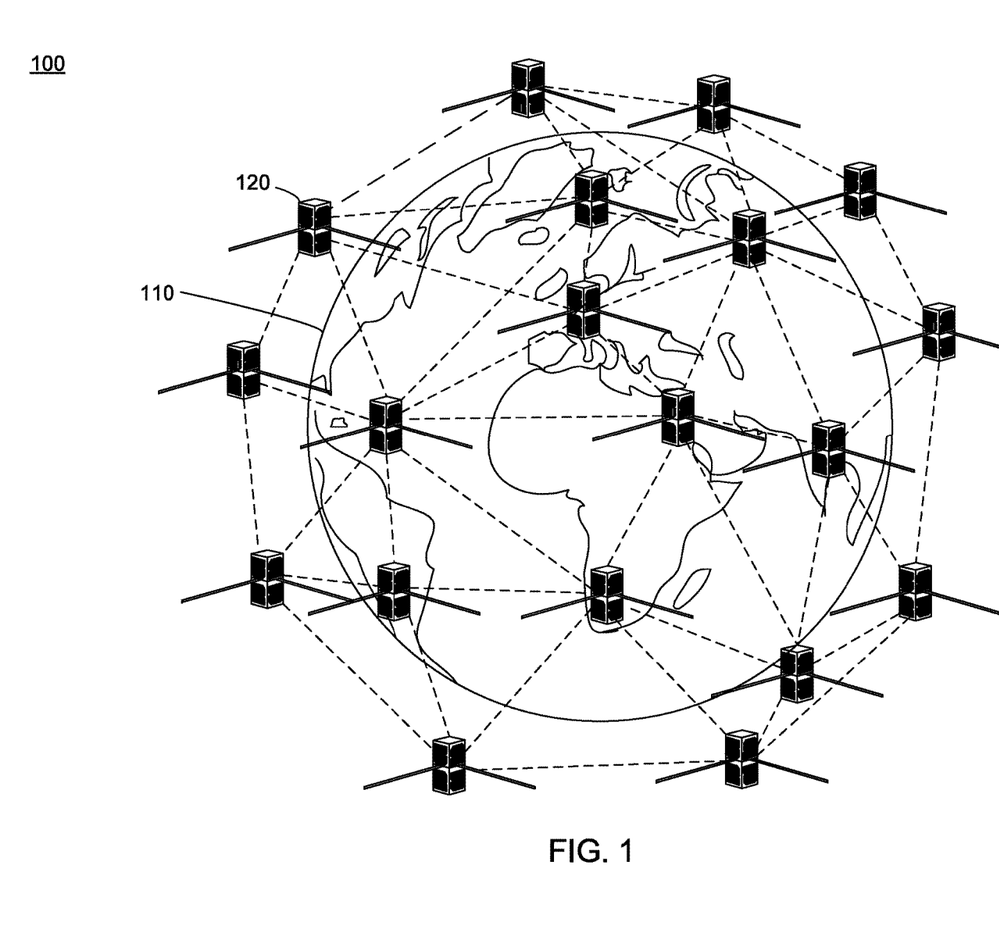
FIG. 1 illustrates an example terrestrial and orbital communication network according to one aspect of the disclosed technology.

The present application relates to, but not limited to, a terrestrial and orbital communication network having a constellation of satellites. FIG. 1 illustrates an exemplary terrestrial and orbital communication network 100 covering at least a portion of a planet 110, such as the Earth. The network 100 may include a constellation of satellites 120 each configured to collect data from a point on the planet from time to time or on a regular basis. The satellite 120 may analyze the collected data to monitor maritime activities, including but not limited to tracking ship or oceangoing vessels, detecting illegal, unreported and unregulated fishing or pirate activities, monitoring trade transit, and detecting oil spill, among other possibilities.

The satellite 120 may be a cubesat having a small form factor. For instance, the size of the satellite 120 may be relatively small, in general not exceeding 10 cm×10 cm×30 cm and 10 kg of mass. In one embodiment, the satellite 120 may be based on an industry standard, developed in 2001 by Stanford University and California Polytechnic Institute and described in the document "CubeSat Design Specification."

Cubesats may be launched and deployed using a common deployment system. For example, cubesats may be launched and deployed from a mechanism called a Poly-PicoSatellite Orbital Deployer (P-POD). P-PODs may be mounted to a launch vehicle and carry cubesats into orbit. P-PODs may deploy cubesats once a proper signal is received from the launch vehicle.

Figure 2:
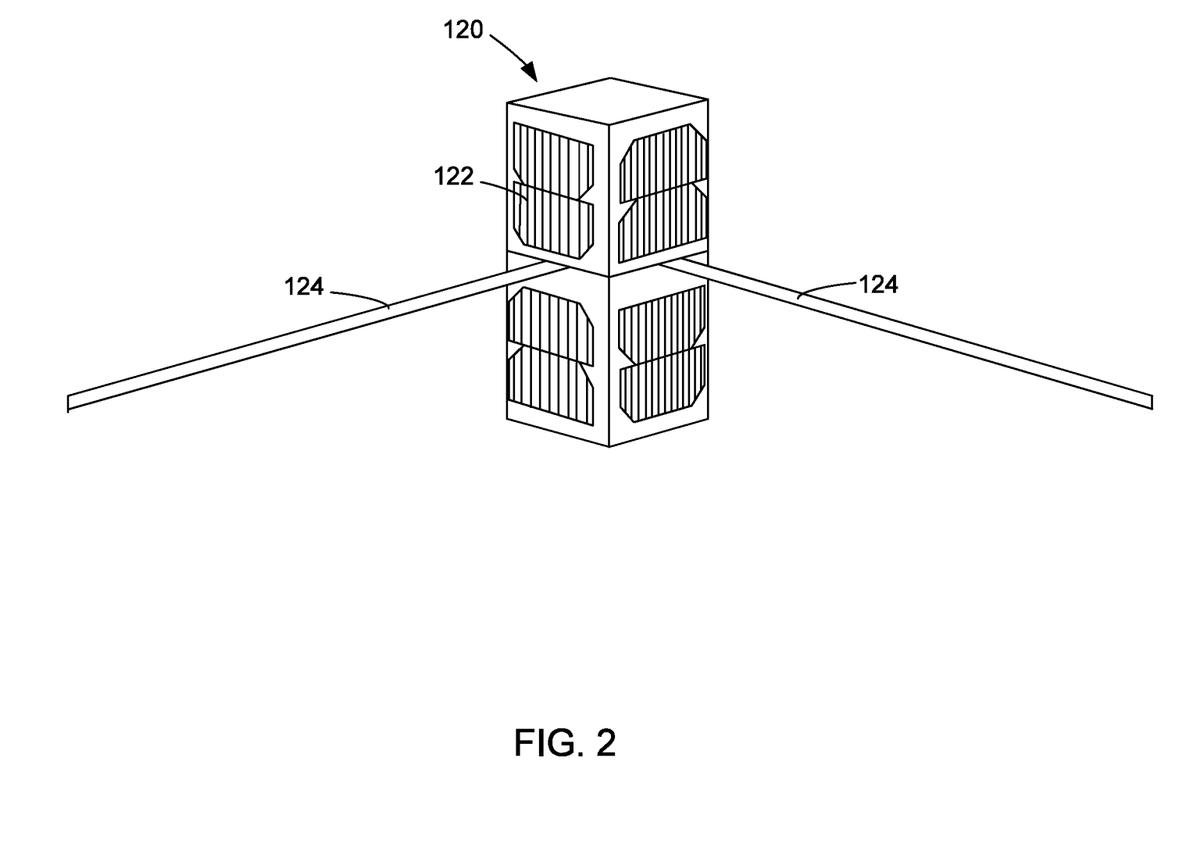
FIG. 2 is a schematic drawing of a satellite according to one aspect of the disclosed technology.

FIG. 2 is a schematic drawing of a satellite according to one aspect of the disclosed technology. As shown in FIG. 2, the satellite 120 may include one or more solar panels 122. The solar panels 122 may be configured to provide energy to one or more components contained within the satellite 120. The satellite 120 may also include one or more antennas 124 that may extend when fully deployed.

Figure 3:
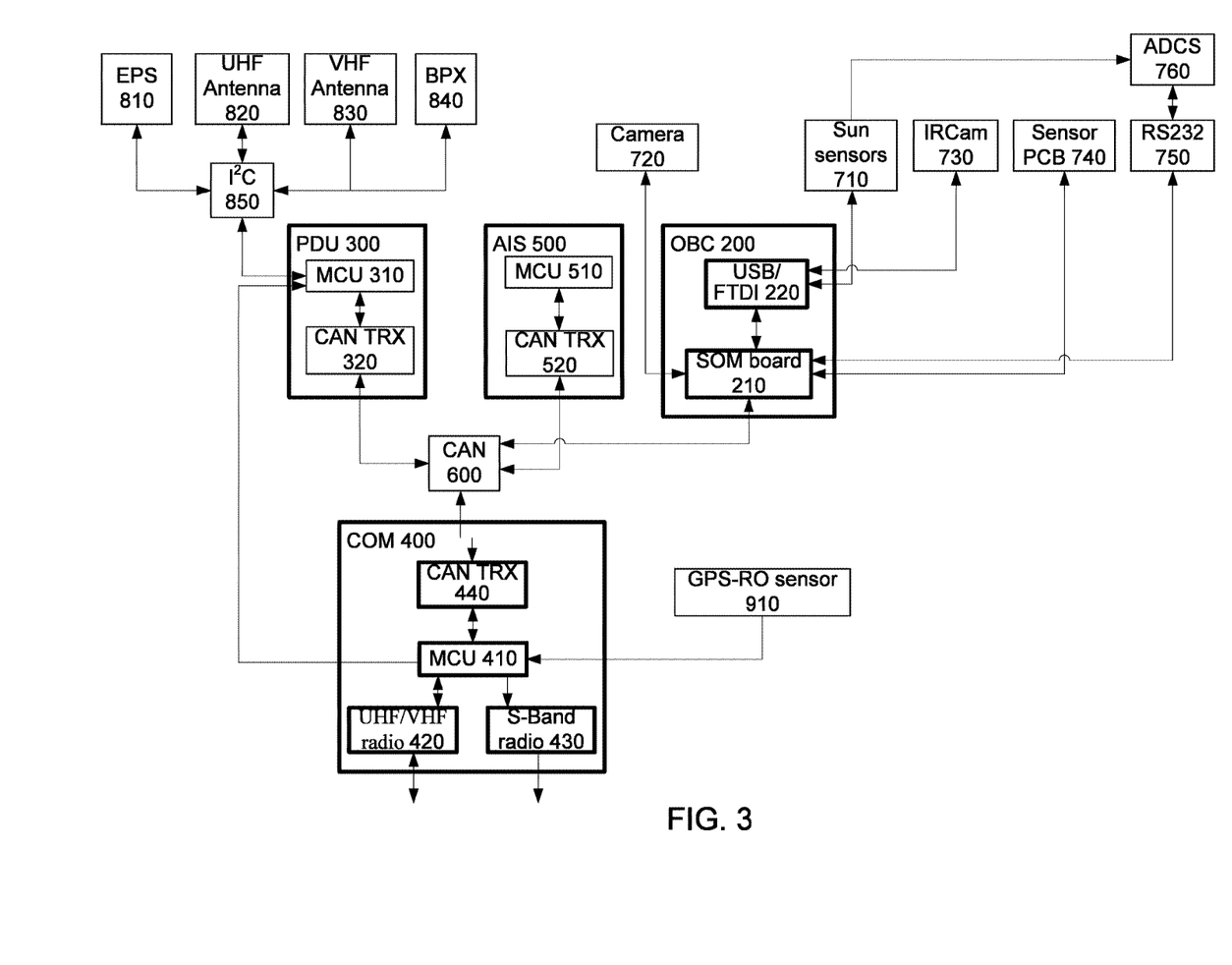
FIG. 3 is a block diagram of satellite architecture according to one aspect of the disclosed technology.

FIG. 3 illustrates an architecture design of the satellite 120 according to one aspect of the disclosed technology. As shown in FIG. 3, the satellite 120 may include an on-board computer (OBC) 200 that acts as a central computer, a power distribution unit (PDU) 300 that routes and regulates power throughout the satellite 120, and a communications system 400 configured to handle radio communications of the satellite 120. The satellite 120 may also include an automatic identification system (AIS) 500. The OBC 200, the PDU 300, the communications system 400, and the AIS 500 may communicate with one another via a controller area network (CAN) bus 600.

As shown in FIG. 3, the OBC 200 may include a System on Module (SOM) board processor 210 and a USB/FTDI connector 220. The PDU 300 may include a microcontroller (MCU) 310 and a CAN transceiver 320. The communications system 400 may include a MCU 410, radios such as a UHF/VHF radio 420 and an S-band radio 430, and a CAN transceiver 440. The AIS 500 may include a MCU 510 and a CAN transceiver 520.

In addition, the satellite 120 may also include one or more other systems, subsystems, components, devices, parts or peripherals. For example, the satellite 120 may include one or more sun sensors 710, one or more cameras such as a camera 720 and an infrared camera 730, a sensor printed circuit board (PCB) 740, RS232 750, and an attitude detection/control system (ADCS) 760 directly or indirectly coupled to the OBC 200. The satellite 120 may include an electrical power source (EPS) 810, a UHF antenna system 820, a VNF antenna system 830, and one or more batteries (BPX) 840, all of which may be coupled to the PDU 300 via an inter-integrated circuit ($I^2C$) 850. Each antenna system may have one or more microcontrollers configured to perform a deployment of the antennas. Each antenna may have four antenna elements that may be deployed individually.

The satellite 120 may also include a GPS radio occultation receiver, such as a GPS radio occultation sensor (GPS-RO) receiver 910, coupled to the communications system 400.

Detailed discussions of the OBC 200 are provided herein.

2. On-Board Computer

The OBC 200 may act as a central computer for the satellite 120.

Figure 4:
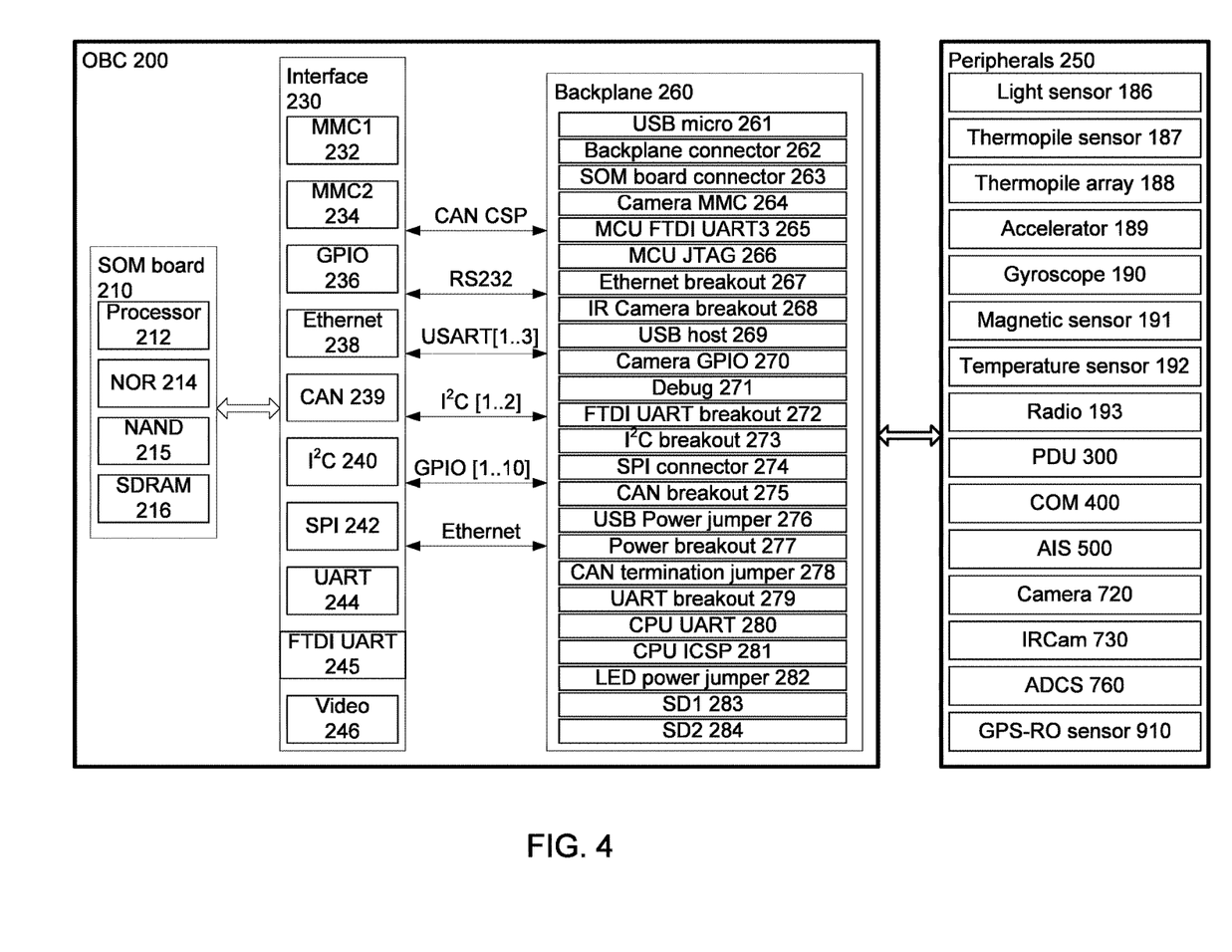
FIG. 4 is a block diagram of the on-board computer according to one aspect of the disclosed technology.

FIG. 4 is a block diagram of the OBC 200 according to one aspect of the disclosed technology. As illustrated in FIG. 4, the OBC 200 may include a system on chip or system on module 210, such as a SOM board. The OBC 200 may also include one or more hardware interfaces 230 and a backplane 260. The OBC 200 may run at a speed between 500 MHz and 1 GHz. Detailed discussions of some components of the OBC 200 are provided herein.

2.1 SOM Board

The SOM board 210 may include a general purpose central processing unit (CPU) powered by a processor 212.

As shown in FIG. 4, the SOM board 210 may include one or more physical storage mediums, including but not limited to one or more of the following: a NOR flash 214, a NAND flash 215 and a SDRAM 216. The NOR flash 214 may have a size up to 128 MB, and may act as a boot memory. The NAND flash 215 may also act as a boot memory. The NAND flash 215 may be of various sizes, including, but not limited to, 128 MB, 256 MB, 512 MB, and 1024 MB. The SDRAM 216 may be a DDR2 SDRAM memory bank. The SDRAM 216 may be of various sizes such as 128 MB or 256 MB. Upon deployment of the satellite 120, software may be loaded from the memory.

In addition, the SOM board 210 may include general purpose connectors, such as pitch stacking connectors, for custom expansions. Further, the SOM board 210 may include one or more of the following: a power supply unit, a non-volatile memory which may provide additional storage area for user-specific usage, a computer clock, and a touch screen controller 2.2 Interface As shown in FIG. 4, the OBC 200 may be implemented with one or more hardware interfaces 230 to interface with one or more payloads, systems, subsystems, apparatus, devices, components, parts, or peripherals, which may be collectively referred to as peripherals 250. The interfaces 230 and the peripherals 250 may be arranged in a manner surrounding the SOM board 210. Example interfaces implemented by the OBC 200 may include, but not limited to, one or more multimedia card (MMC) interfaces 232 and 234, a general-purpose input/output (GPIO) 236 for interface with a camera, an Ethernet interface 238 for debugging, a controller area network (CAN) interface 239 for a Cubesat Space Protocol (CSP) bus, an $I^2C$ 240 for interface with one or more low-level sensors, a serial peripheral interface (SPI) 242 for a high-speed radio, one or more universal asynchronous receivers/transmitters (UART) 244 for interface with one or more peripherals, one or more FTDI UART 245, and a video interface 246 for receiving or transmitting high band width data. Details with regard to each interface are provided herein.

An MMC interface 232 or 234 may be implemented by one or more MMC host controllers integrated in the processor 212 of the OBC 200. The MMC interface may be coupled to a secure digital (SD) card, e.g., a multimedia card, to store system memory. Alternatively, the MMC interface may interface to a camera, such as a high-definition personal camera, that captures still photos or videos. Such a camera may work automatically with minimum intervention, or remotely controlled. In one embodiment, the OBC 200 may include two MMC interfaces 232 and 234.

The GPIO 236 may include a generic pin on an integrated circuit, and its behavior may be controlled by a user at run time. The GPIO interface 236 may be configured to be coupled to a camera, such as a high-definition personal camera, to capture still photos or videos. Such a camera may work automatically with minimum intervention, or remotely controlled.

The Ethernet interface 238 may be implemented by an Ethernet physical layer that provides interface signals. The Ethernet interface 238 may be configured to serve for debugging purposes.

The CAN interface 239 may be implemented by a CAN controller integrated in the processor 212. The CAN controller may be a high end CAN controller (HECC). The HECC may be connected to an on-board physical layer. Signal lines such as CANH and CANL may be routed to a connector. The CAN interface 239 may serve as a CSP bus. The CAN interface 239 may connect the OBC 200 with the PDU 300, the communications system 400, and the AIS 500.

The OBC 200 may include one or more I²C 240 for interface with one or more low-level sensors. Such low-level sensors may include, but not limited to, a light sensor 186, a thermopile sensor 187 for temperature measurement, a thermopile array 188 for temperature measurement, an accelerator 189, a gyroscope such as a digital output MEMS gyroscope 190, a magnetic sensor 191, and a temperature sensor 192. In one example, the OBC 200 may include two I²C.

The OBC 200 may include an SPI 242 for interface with a radio 193 such as a high-speed radio. The SPI 242 may include an optional low-voltage differential signaling (LVDS) level shifting. The OBC 200 may include an SPI channel, and may have a port that provides 3 chip selects such as MCSPI1_CS0, MCSPI1_CS1, and MCSPI1_CS2.

The OBC 200 may include one or more UARTs 244 for communication with one or more systems. A UART 244 may be an individual or part of an integrated circuit used for serial communications over a computer or peripheral device serial port. The UART 244 may take bytes of data and transmit the individual bits in a sequential fashion. The UART 244 may be used in conjunction with communication standards such as RS-232. The OBC 200 may be connected to one or more systems over the UART 244 in different ways. UART ports may be routed to connectors of the OBC 200. In one example, the OBC 200 may include four UARTs. In one embodiment, the OBC 200 may include one or more direct MCU UART channels. Such channels may serve one or more of the following functions: debug port, GPS-RO sensor UART, and ADCS UART.

In another embodiment, the OBC 200 may include one or more FTDI UART 245 channels. In this embodiment, four extra UART ports may be created through a MCU's USB1 port using a USB-4xUART chip. The whole FTDI circuit may be switched on/off through a GPIO pin. One or more FTDI UART channels may serve one or more of the following functions: UART on the backplane for infrared camera (IR Camera) 730, debug port for the PDU 300, debug port for the communications system 400, extra connector, and generic UART.

The OBC 200 may include a video interface 246 for high band width data. For example, the video interface 246 may be a parallel video interface having a port configured to interface with an infrared camera 730 In one embodiment, the OBC 200 may not directly interface with the UHF/VHF radio 420 and the S-band radio 430.

2.3 Connectors

The backplane 260 may serve as a backbone for connecting one or more printed circuit boards or peripherals 250 to the OBC 200. The backplane 260 may include one or more electrical connectors and parallel signal traces that connect one or more printed circuit boards or peripherals 250 to the OBC 200. Each pin of each connector may be linked to the same relative pin of all the other connectors to form a common computer bus.

According to one embodiment, the OBC 200 may have a top side with one or more of the following connectors: USB micro connector 261, backplane connector 262, and SOM board connectors 263, Camera MMC connector 264, MCU FTDI UART3 265, MCU JTAG 266, Ethernet breakout 267, IR Camera breakout 268, USB host 269, Camera GPIO connector 270, Debug/bootstrap UART3 breakout/FTDI UART breakout 271, FTDI UART breakout 272, I²C breakout 273, serial peripheral interface (SPI) connector 274, CAN breakout 275, USB power jumper 276, power breakout 277, CAN termination jumper 278, UART breakout 279, CPU UART 280, CPU ICSP 281, and LED power jumper 282.

The USB micro connector 261 may be configured to connect to an FTDI USB to 4x serial port converter. The USB micro connector 261 may be connected to one or more ports with the following connections: Debug UART, GPS-RO sensor UART, ADCS UART, and infrared camera UART.

The Camera MMC connector 264 may have one or more of the following pins: command (e.g., MMC_CMD), Serial Clock (e.g., MMC_SCK), Data (e.g., MMC_DAT0, MMC_DAT1, MMC_DAT2 and MMC_DAT3), ground (e.g., GND), and power supply (e.g., 3.3V).

The MCU FTDI UART3 265 may have one or more pins associated with one or more of the following functions: transmit data (e.g., MCU-FTDI-TXD1), receive data (e.g., MCU-FTDI-RXD1), and ground (e.g., GND).

The MCU JTAG 266 may have one or more pins associated with one or more of the following functions: test clock (e.g., TCK), test data in (e.g., TDI), test data out (e.g., TDO), test mode select (e.g., TMS), rest (e.g., RST), power supply (e.g., 3.3V), and ground (e.g., GND).

The Ethernet breakout 267 may have one or more pins associated with one or more of the following functions: receive data (e.g., RX+ and RX−), transmit data (e.g., TX+ and TX−), light emitting diode (e.g., LED1 and LED2), and ground (e.g., GND).

The IR Camera breakout 268 may have one or more pins associated with one or more of the following functions: horizontal sync (e.g., HSYNC), vertical sync (e.g., VSYNC), processor clock (e.g., PCLK), data (e.g., DATA0, DATA1, DATA2, DATA3, DATA4, DATA5, DATA6 and DATA7), and ground (e.g., GND).

The USB host 269 may have one or more pins associated with one or more of the following functions: power supply (e.g., 5V), ground (e.g., GND), and USB data (e.g., USB2− and USB2+).

The Camera GPIO connector 270 may have one or more pins associated with one or more of the following functions: power supply (e.g., 3.3V coming from Camera), ground (e.g., GND), and camera data The Debug/bootstrap UART3 breakout/FTDI UART breakout 271 may have one or more pins associated with one or more of the following functions: receive data (e.g., MCU-FTDI-TXD2), transmit data (e.g., MCU-FTDI-RXD2), and ground (e.g., GND).

The FTDI UART breakout 272 may have one or more pins associated with one or more of the following functions: receive data (e.g., MCU-FTDI-TXD3), transmit data (e.g., MCU-FTDI-RXD3), and ground (GND).

The I²C breakout 273 may have one or more pins associated with one or more of the following functions: serial clock line (e.g., SCL0 and SCL1), serial data line (e.g., SDA0 and SDA1), and ground (e.g., GND).

The SPI connector 274 may have one or more pins associated with one or more of the following functions: serial clock (e.g., SPI SCK LVDS+, SPI SCK LVDS− and SPI SCK), ground (e.g., GND), master OUT slave IN (e.g., SPI MOSI, SPI MOSI LVDS+ and SPI MOSI LVDS−), and master IN slave OUT (e.g., SPI MISO, SPI MISO LVDS+ and SPI MISO LVDS−), chip select (e.g., SPI CS1 and SPI CS2), and high speed general-purpose input/output (e.g., HS GPIO0 and HS GPIO1).

The CAN breakout 275 may have one or more pins associated with one or more of the following functions: high voltage signal (e.g., CANH) and low voltage signal (e.g., CANL).

The USB power jumper 276 may have one or more pins associated with the following function: power supply (e.g., 5V USB and 5V).

The power breakout 277 may have one or more pins associated with one or more of the following functions: power supply (e.g., 5V and 3.3V), battery voltage (e.g., VBAT), and ground (e.g., GND).

The CAN termination jumper 278 may have one or more pins associated with one or more of the following functions: high voltage signal (e.g., CANH) and low voltage signal (e.g., CANL).

The UART breakout 279 may have one or more pins associated with one or more of the following functions: receive data (e.g., ADCS_RX and GPS-RO sensor_RX) and transmit data (e.g., ADCS_TX and GPS-RO sensor_TX).

The CPU UART 280 may have one or more pins associated with one or more of the following functions: receive data (e.g., RX) and transmit data (e.g., TX).

The LED power jumper 282 may have one or more pins associated with the following function: ground (e.g., GND and LED_GND).

According to one embodiment, the OBC 200 may have a bottom side with one or more of secure digital (SD) connectors 283. For instance, SD1 283 may connect to MMC1 on the SOM board 210 directly. SD2 284 may connect to MMC2 on the SOM board 210 through a multiplexer, e.g., camera SD mux.

The OBC 200 may have many advantages. For example, the OBC 200 may have a small form factor with inexpensive connectors. The OBC 200 may offer high flexibility, great performances, low power consumption and a rich interface set. The OBC 200 may work in extreme environmental conditions. For example, the OBC 200 may work in an extended temperature range from −40° C. to +85° C.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation. For example, the disclosed technology may be implemented in an aerospace device or system, including but not limited to, satellite communication systems of all sizes, and aircrafts including airplanes, jets, and air balloon, among other possibilities. The disclosed technology may serve multiple purposes, including monitoring maritime activities, monitoring trade transit, general aviation, commercial and private purposes including transport and cargo services, and military purposes, among other possibilities.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claim is:

1. An on-board computer implemented in a cubesat communications system, comprising:
   a processor;
   a memory storing system initiation information;
   a backplane having a plurality of connectors that connect the processor to a plurality of peripherals external to the on-board computer but within the cubesat communications system; and
   a plurality of hardware interfaces that facilitate communication between the processor and the peripherals, the hardware interfaces including:
      a multimedia card (MMC) interface;
      a general-purpose input output (GPIO);
      an Ethernet interface;
      a controller area network (CAN) interface;
      an inter-integrated circuit ($I^2C$);

a serial peripheral interface (SPI).
a universal asynchronous receiver/transmitter (UART); and
a video interface,
wherein the on-board computer is connected, via a CAN bus, to at least one of the peripherals external to the on-board computer but within the cubesat communications system.

2. The on-board computer of claim 1, wherein the MMC interface interfaces to a camera.

3. The on-board computer of claim 1, wherein the GPIO interfaces to a camera.

4. The on-board computer of claim 1, wherein the I²C interfaces to at least one of low-level sensors including a light sensor, a thermopile sensor, a thermopile array, an accelerator, a gyroscope, a magnetic sensor, and a temperature sensor.

5. The on-board computer of claim 1, wherein the SPI interfaces to a radio.

6. The on-board computer of claim 1, wherein the UART interfaces to a GPS radio occultation receiver.

7. The on-board computer of claim 1, wherein the UART interfaces to an attitude detection/control system.

8. The on-board computer of claim 1, wherein the video interface interfaces to an infrared camera.

9. The on-board computer of claim 1, wherein the processor is a Linux-enabled processor.

10. The on-board computer of claim 1, wherein the memory includes a NOR flash, a NAND flash and a SDRAM.

11. The on-board computer of claim 1, wherein the plurality of connectors include USB micro connector, backplane connector, and SOM board connectors, Camera MMC connector, MCU FTDI UART3, MCU JTAG, Ethernet breakout, IR Camera breakout, USB host, Camera GPIO connector, Debug/bootstrap UART3 breakout/FTDI UART breakout, FTDI UART breakout, I2C breakout, serial peripheral interface (SPI) connector, CAN breakout, USB power jumper, power breakout, CAN termination jumper, UART breakout, CPU UART, CPU ICSP, and LED power jumper.

12. A cubesat communications system comprising:
an on-board computer implemented on a hardware platform of the cubesat communications systems, including:
a processor;
a memory storing selected boot information;
a hardware interface implemented on the hardware platform to facilitate communication between the processor and a plurality of peripherals external to the on-board computer; and
a backplane having a connector connecting the processor to the peripherals; and
a controller area network (CAN) bus connecting the on-board computer to at least one of the peripherals external to the on-board computer but within the cubesat communications system.

13. The system of claim 12, wherein the hardware platform implements a multimedia card interface, a general-purpose input output, an Ethernet interface, a controller area network interface, an inter-integrated circuit, a serial peripheral interface, a universal asynchronous receiver/transmitter and a video interface.

14. The system of claim 12, wherein the hardware platform implements a plurality of hardware interfaces for interface with a camera, at least one of low-level sensors including a light sensor, a thermopile sensor, a thermopile array, an accelerator, a gyroscope, a magnetic sensor, and a temperature sensor, a radio, a GPS radio occultation receiver, an attitude detection/control system and an infrared camera.

15. The system of claim 12, wherein the hardware platform implements a plurality of connectors including USB micro connector, backplane connector, and SOM board connectors, Camera MMC connector, MCU FTDI UART3, MCU JTAG, Ethernet breakout, IR Camera breakout, USB host, Camera GPIO connector, Debug/bootstrap UART3 breakout/FTDI UART breakout, FTDI UART breakout, I2C breakout, serial peripheral interface (SPI) connector, CAN breakout, USB power jumper, power breakout, CAN termination jumper, UART breakout, CPU UART, CPU ICSP, and LED power jumper.

16. The system of claim 12, wherein the memory includes a NOR flash, a NAND flash and a SDRAM.

* * * * *